(12) United States Patent
Golan et al.

(10) Patent No.: US 8,964,036 B2
(45) Date of Patent: **\*Feb. 24, 2015**

(54) SYSTEM AND METHOD FOR CAPTURING, STORING, ANALYZING AND DISPLAYING DATA RELATED TO THE MOVEMENTS OF OBJECTS

(71) Applicant: Verint Systems Inc., Melville, NY (US)

(72) Inventors: Oren Golan, Or-Yehuda (IL); Boaz Dudovich, Rehovot (IL); Shahar Daliyot, Rehovot (IL); Itzik Horovitz, Holon (IL); Shmuel Kiro, Rehovot (IL)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,187

(22) Filed: Apr. 3, 2013

(65) Prior Publication Data

US 2013/0223688 A1 Aug. 29, 2013

Related U.S. Application Data

(63) Continuation of application No. 12/504,492, filed on Jul. 16, 2009.

(60) Provisional application No. 61/135,047, filed on Jul. 16, 2008, provisional application No. 61/139,933, filed on Dec. 22, 2008.

(51) Int. Cl.
*H04N 7/16* (2011.01)
*H04N 5/225* (2006.01)
(Continued)

(52) U.S. Cl.
CPC ............ *H04N 7/181* (2013.01); *G06K 9/00771* (2013.01); *G06K 9/6253* (2013.01); *G06Q 30/02* (2013.01); *H04N 7/18* (2013.01); *G06T 7/004* (2013.01)
USPC ........... 348/150; 348/153; 348/155; 348/169; 348/39

(58) Field of Classification Search
USPC ..................... 348/39, 150–155, 169
See application file for complete search history.

(56) References Cited

U.S. PATENT DOCUMENTS

| 4,630,110 A | 12/1986 | Cotton et al. |
| 4,992,866 A | 2/1991 | Morgan |

(Continued)

FOREIGN PATENT DOCUMENTS

| FR | 2800895 | 5/2001 |
| GB | 2424784 | 10/2006 |

(Continued)

OTHER PUBLICATIONS

Desurmont et al., "A general-purpose system for distributed surveillance and communication", In Intelligent Distributed Video Surveillance Systems, 2006, 121-156.

(Continued)

*Primary Examiner* — Ebrahim Golabbakhsh
(74) *Attorney, Agent, or Firm* — Meunier Carlin & Curfman

(57) ABSTRACT

A system and method for the capture and storage of data relating to the movements of objects, in a specified area and enables this data to be displayed in a graphically meaningful and useful manner. Video data is collected and video metadata is generated relating to objects (persons) appearing in the video data and their movements over time. The movements of the objects are then analyzed to detect the movements within a region of interest. This detection of movement allows a user, such as a manager of a store, to make informed decisions as to the infrastructure and operation of the store. One detection method relates to the number of people that are present in a region of interest for a specified time period. A second detection method relates to the number of people that remain or dwell in a particular area for a particular time period. A third detection method determines the flow of people and the direction they take within a region of interest. A fourth detection method relates to the number of people that enter a certain area by crossing a virtual line, a tripwire.

5 Claims, 15 Drawing Sheets

(51) Int. Cl.
*H04N 7/00* (2011.01)
*H04N 7/18* (2006.01)
*G06K 9/00* (2006.01)
*G06K 9/62* (2006.01)
*G06Q 30/02* (2012.01)
*G06T 7/00* (2006.01)

(56) References Cited

U.S. PATENT DOCUMENTS

| | | | |
|---|---|---|---|
| 6,195,121 B1 | 2/2001 | Huang et al. | |
| 6,327,522 B1* | 12/2001 | Kojima et al. | 701/1 |
| 7,068,842 B2 | 6/2006 | Liang et al. | |
| 7,221,367 B2 | 5/2007 | Cardno | |
| 7,319,479 B1 | 1/2008 | Crabtree et al. | |
| 2003/0034876 A1 | 2/2003 | Puchek et al. | |
| 2003/0051059 A1 | 3/2003 | Zondervan et al. | |
| 2005/0036659 A1* | 2/2005 | Talmon et al. | 382/103 |
| 2005/0163345 A1 | 7/2005 | van den Bergen et al. | |
| 2006/0210264 A1* | 9/2006 | Saga | 396/287 |
| 2006/0227862 A1* | 10/2006 | Campbell et al. | 375/240 |
| 2006/0284976 A1* | 12/2006 | Girgensohn et al. | 348/135 |
| 2007/0296739 A1* | 12/2007 | Lonn | 345/634 |
| 2008/0008364 A1* | 1/2008 | Huang et al. | 382/120 |
| 2008/0025574 A1 | 1/2008 | Morikawa et al. | |
| 2008/0074496 A1 | 3/2008 | Venetianer et al. | |
| 2008/0088706 A1 | 4/2008 | Girgensohn et al. | |
| 2008/0106599 A1 | 5/2008 | Liu et al. | |
| 2008/0184245 A1 | 7/2008 | St-Jean | |
| 2008/0212099 A1 | 9/2008 | Chen | |
| 2010/0166324 A1 | 7/2010 | Kundu et al. | |
| 2013/0053002 A1* | 2/2013 | Hymes | 455/414.1 |
| 2013/0231863 A1* | 9/2013 | Okamoto et al. | 701/533 |

FOREIGN PATENT DOCUMENTS

| | | |
|---|---|---|
| WO | 9935850 | 7/1999 |
| WO | 2004042513 | 5/2004 |
| WO | 2005027068 | 3/2005 |
| WO | 2007094802 | 8/2007 |
| WO | 2007124138 | 11/2007 |

OTHER PUBLICATIONS

Senior et al., "Video analytics for retail", 2007 IEEE Conference on Advanced Video and Signal Based Surveillance, Sep. 5-7, 2007, 423-428.

Tian et al., "IBM smart surveillance system (S3): event based video surveillance system with an open and extensible framework", Machine Vision and Applicaitons, Jun. 24, 2008, 19(5-6):315-327.

Valera et al., "A review of the state-of-the-art in distributed surveillance systems", In Intelligent Distributed Video Surveillance Systems, 2006.

European Search Report for EP09251808 dated Oct. 8, 2012.

Press Release, "Intelligent Queue Management Builds Sales at Tesco, says Sir Terry Leahy", Marion Bauer, Marketing Communications, Irisys, Oct. 5, 2006.

* cited by examiner

SYSTEM AND METHOD FOR CAPTURING, STORING, ANALYZING AND DISPLAYING DATA RELATED TO THE MOVEMENTS OF OBJECTS

CROSS REFERENCE TO RELATED APPLICATIONS

This application is continuation of U.S. application Ser. No. 12/504,492, filed Jun. 16, 2009, which application was published on Jan. 21, 2010, as U.S. Publication No. US2010/0013931, and claims priority to U.S. Provisional Application Nos. 61/135,047, filed Jul. 16, 2008, and 61/139,933, filed Dec. 22, 2008, the contents of which are incorporated herein by reference in the entireties.

FIELD OF THE INVENTION

The present invention generally relates to systems and methods for capturing, storing, analyzing and displaying data relating to the movements of objects, and more particularly to systems and methods for capturing, storing, analyzing data relating to the movements of persons of interest (POIs) in a specified area and displaying this data in a graphically meaningful and useful manner.

BACKGROUND OF THE INVENTION

Video surveillance systems normally include a recorder for recording the video captured by the surveillance cameras. Initially, videocassette recorders were used for recording this data; however, the tapes could only be searched by having personnel review the tapes to find the portion of interest. This process was extremely time consuming and labor intensive. The development of digital video recorders improved the searching process with the use of algorithms to search for specific items, such as when an item has disappeared from the area being viewed by the video camera. However, the ability to quickly and easily find and track moving objects within a prescribed area contained within a video clip has not significantly improved. The process still requires personnel to review the video as with VCR tapes. Accordingly, there has been a long felt need in the art for a system and method of quickly searching through recorded video data to locate the moving objects and video of interest.

Merchandising within a retail store location involves marketing the right merchandise at the right place, at the right time, in the right quantities, and at the right price. Retail stores create planograms of shelf locations for the placement of products on shelves. They further create floor plans for the location of aisles and the direction of traffic flow through the store. Endcaps on aisles are a favor location for the merchandising of products. The stores are able to price the placement of products on certain shelves and endcaps relative to the desirability of those locations. For example, placement of products on shelves at eye level is more expensive than placement of the products on the bottom shelves near the floor. Similarly, endcaps near the front the store are more desirable than endcaps at the rear of the store.

Presently, there exist few means of quantitatively measuring the effectiveness of particular floor plans, planograms, endcap placement or other merchandising methods. Sales from the product from these locations are one gross means of determining the desirability and therefore the price of a particular location. Accordingly, there has been a long felt need in the art for a method and system for quantitatively measuring the desirability of locations within a retail location.

SUMMARY OF THE INVENTION

The present invention is a system and method for the capture and storage of data relating to the movements of objects, preferably people, in a prescribed area and enables this data to be displayed in a graphically meaningful and useful manner. The system collects data, e.g., image/video data using known sources by, e.g., video cameras, infrared cameras and determines the presence and tracks the movements of persons in a Region Of Interest (ROI) over time. Preferably, the system is operable to generate and display a variety of different reports based on the collected data.

The system preferably initially analyzes the collected video data and generates video metadata, i.e., data about the video. Preferably, this metadata relates to objects (persons) appearing in the video and tracks their movements (location) over time. The metadata is then stored so that it can be accessed and analyzed separately from the raw image data. It is well known that video metadata takes up a significantly smaller amount of memory storage space than the raw video for a given time sequence of events. Moreover, the processing time required to extract data, such as dwell time, directional analysis and other statistical analysis, is significantly reduced when operating on stored video metadata rather than actual raw video data. In addition, a significant savings in bandwidth can be attained using metadata when the data is transmitted, e.g., over a network.

In a preferred embodiment, the video data is converted substantially in real time into metadata, which permits the information to be rapidly analyzed. However, the invention is not so limited and the metadata can be generated from stored or archived video data. Analyzing the raw video data, the system uniquely recognizes, detects, a person as they enter a ROI being monitored by, e.g., a camera. The system then tracks the movement of that person for as long as he or she stays within the ROI. Again, this tracking of the physical movement of the person within the ROI is stored as the metadata. As will be discussed with reference to an exemplary embodiment, the ROI itself preferably can be changed by a user of the system so that occurrences of interest that may have occurred within a subset of the ROI can be graphically displayed from the larger amount of data for the entire ROI, i.e., the entire region covered by the video camera. As appreciates by those skilled in the art, the system is able to simultaneously recognize and track a plurality of moving objects/people appearing in a video.

Because video metadata contains, for example, information as to the size, position and movements of an object or objects in video, the movements can be analyzed for the generation of reports as to the movements of POIs within a ROI by a computer program.

The ability to recognize, follow the movements of, and distinguish between individual persons within a ROI using video metadata is known. An example of a system that allows a video detection system using video metadata to distinguish between objects, such as persons, within an ROI is shown in U.S. patent application Ser. No. 11/844,759, filed Aug. 24, 2007, and entitled Event Detection Based on Video Metadata, which is incorporated herein by reference in its entirety.

While a preferred embodiment uses video metadata to obtain the information from which the reports are generated, the invention is not limited to that method of gathering the information. Other methods of gathering positional data relating to POIs in an ROI can be used to provide the data for the system. For example, infrared information can be used to provide data indicative of the movement of persons in an ROI. The present system is not limited to any particular method of gathering the positional information and can be used with any collected data that includes positional data of POIs over time in an ROI.

In the exemplary embodiments of a retail traffic analyzer set forth below, a retail establishment, in particular one having retail stores at various locations, can obtain data relating to the movements of customers within ROIs within each store. The data can be analyzed and reports can be generated, which present the data in a manner that allows a user, such as a manager of a store, or of a region, to make informed decisions as to how to effect store and aisle layout, endcap positioning, advertising campaigns, hours of operation, and other parameters of store operation.

As will be further described below, the retail traffic analyzer preferably provides an interactive graphical user interface that allows a user to easily compare data from, among other things, different stores, departments, time periods, ROIs and directions. The retail traffic analyzer preferably provides reports of the following types: Shoppers in region analysis; Dwell time analysis; Directional analysis and Shoppers entering area analysis.

The Shoppers in region analysis relates to the number of shoppers that are present in a ROI, or in multiple ROIs, for a specified time period. Dwell time analysis relates to the number of shoppers that remain or dwell in a particular area for a particular time period. As will be understood, the fact that customers dwell in one area of a store as opposed to another area would be very useful in ascertaining, for example, the success of product placement and/or store signage. Dwell time could, for example, be set to be the number of shoppers who remain in the ROI for more than 20 but less than 40 seconds.

Directional analysis provides for the display of the flow of shoppers and the direction they take within a ROI. Shoppers entering area analysis provides for the display of the number of shoppers that enter a certain area by crossing a virtual line, a tripwire.

In each of the above types of analysis, the retail traffic analyzer allows for the data to be compared for different ROIs, in different departments, and in different stores, as will be discussed in more detail below. For example, the number of shoppers entering one ROI for a particular time period can be graphically compared with the number of shoppers entering a different ROI for that period. Also, different graphical representations of the same data are available. For example, dwell time may be shown in the form of a bar graph, or in the form of a bar graph, or can be shown in the form of a "heat map," which represents the amount of dwell time in a color coded map analogous to heat images.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
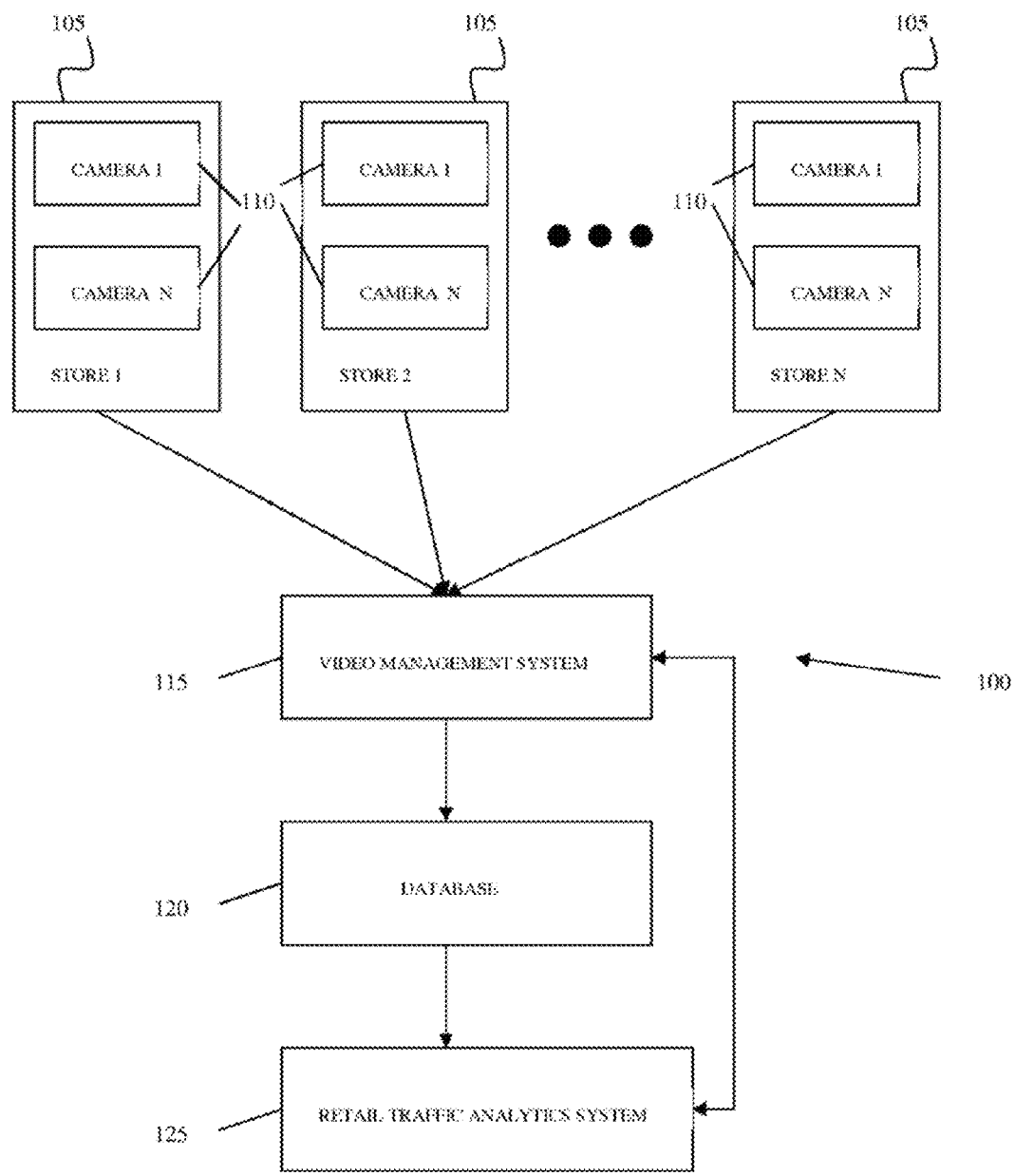
FIG. 1 is a system diagram illustrating the components of a system according to the present invention.

The basic system 100 for providing analysis of foot traffic in a retail store is shown schematically in FIG. 1. The system includes a series of cameras 110 located at various locations in a number of stores 105. The cameras correspond generally to ROIs and are typically cameras used for surveillance in a retail store 105. Although depicted as comprising several stores 105, one skilled in the art can appreciate that system 100 can be used in connection with a single store 105.

The raw video data from cameras 105 is sent to a Video Management Unit 115. One function of the Video Management Unit 115 is to store raw video data, preferably in a compressed form. The Video Management System 115 further includes a video analytics engine that processes the recorded video from each one of the surveillance cameras 110 in the store and generates data that contains the location and time of every person in the store throughout the entire day. This analytics engine, also know as a metadata conversion module, may for example include software on one or more computers. The analytics engine converts the stored video data into video metadata that is data about the video. The data can include data about objects appearing in the video including, e.g., position, time and velocity of the object, as well as height or any other characteristic that can be ascertained by video analytic techniques. Alternatively, the analytics engine can operate on a real time stream of video data rather than operating on stored video data, thus generating the metadata "on-the-fly." The processed object data, or metadata is then stored in database 120. The database 120, also know as a video storage unit, is shown in FIG. 1 as being a single unit but may in fact consist of a number of storage units distributed and accessible on a network.

The above process of generating video metadata can be run continuously every day for unlimited amount of time. As a result of this processing activity the system of the present invention has the information of time and place of every person in the store. From this information it is now easy to answer queries and draw graphs of number of people in certain places in the store in a requested time frame. This processing of user queries and generation of reports is accomplished by the Retail Traffic Analytics system (RTA) 125 which is coupled to and acts on the video metadata stored in Database 120. The RTA 125 contains a processing engine sometimes known as an object movement analytics engine since it analyzes the movement of objects in the prescribed physical area, identifying the moving objects that satisfy the user's criteria specified in her query. As further described in detail below, a user of the system of the present invention can thus compare the number of people between different places or between numbers of people in a specified location in different times. The user can also know if people dwelled and for how long, to what direction people were moving and many extract many other pieced of information.

Figure 2:
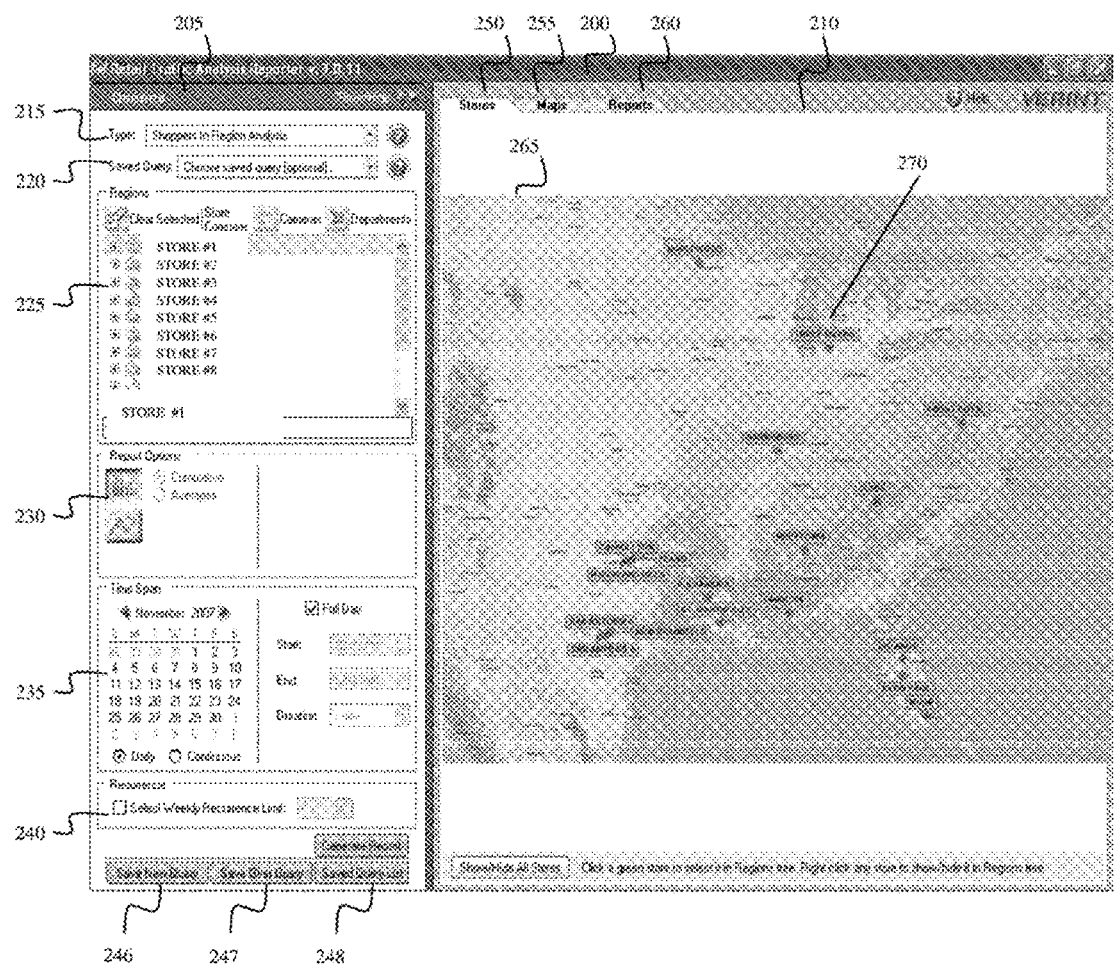
FIG. 2 depicts the main user interface to the system of the present invention.

Explanation of the operation of the RTA 125 of the present invention is best achieved though a discussion of the Graphical User Interfaces (GUIs) of the system. FIG. 2 illustrates an exemplary initial window 200 that a user encounters once the traffic analyzer is running. The application window 200 is divided into two main sections, the Queries Pane 205 and the Reports Viewer 210. The Queries Pane 205 is located on the left side of the application window 200 and enables the user to select a predefined query or create his/her own query for a specific report type and generate a report for the query. The Reports Viewer 210 is located on the right side of the application window 200 and enables the user to view various geographical maps, store floor plans (including camera locations) and the various reports generated by the system The Queries Pane 205 and Reports Viewer 210 will next be discussed in detail. The Queries Pane 205, located on the left side of the application window in FIG. 2, enables the user to select, define (and store)) queries that are used to generate reports. The Queries Pane 205 includes the following sections: Type 215; Saved Query 220; Regions 225; Report Options 235; Time Span 235; Recurrence 240; and Control Buttons 245-248.

The Type area 215 includes a drop down menu that enables the user to select the type of report the user wants to generate. As will be more fully described below, the preferred embodiment of the system of the present invention performs at least four different types of analysis which generates different reports for the user. From the drop down menu of the Type area 215 the user can preferably select from the following report types: Shoppers In Region Analysis; Dwell Time Analysis; Directional Analysis; and Shoppers Entering Area Analysis.

The Shoppers In Region Analysis analyzes the previously described video metadata, identifies and counts the moving objects in the video and generates reports and graphical displays that describe and illustrate the number of shoppers present in a specific ROI or in multiple ROIs for a specified time frame. The selection of the ROI and time frame will be described below with respect to areas 225 and 235 of the application window 200.

Dwell Time Analysis analyzes the metadata and generates reports and graphical displays that describe and illustrate the number of shoppers that "dwell" in a particular area over a defined time period. For example, the number of shoppers who remained in the ROI in the area for more than 20 seconds but less than 40 seconds. This time period is configurable by the user prior to running the Dwell Time Analysis. In one embodiment of the present invention, only single cameras can be selected for this query type, but in a single camera it is possible to compare several ROIs.

Directional Analysis analyzes the metadata and generates reports and graphical displays that describe and illustrate the flow of shoppers within the store and the direction they take. In one embodiment of the present invention, only single cameras can be selected for this query type, but in a single camera it is possible to compare several ROIs and several directions for each ROI.

Shoppers Entering Area Analysis analyzes the metadata and generates reports and graphical displays that describe and illustrate the number of shoppers who enter a specific store area or department from more than one location by crossing a virtual line. If the user wants to compare the number of shoppers present in more than one area, multiple cameras/virtual lines can be selected for analysis by this module.

The Saved Query drop down menu 220 enables the user to select predefined queries, that the user has previously saved, and either run the selected query as is, or modify the query according to specific requirements. Modifications to these queries are not saved unless the user saves the query under a new name using the Save New Query button 246 or saves the modified query using the Save Over Query button 247. Using saved queries makes it easier for the user to obtain predefined and familiar reports from the system without having to define each of the specific parameters for the desired analysis again.

The Regions area 225 displays a tree hierarchy of all the stores and the cameras in each store including the default ROI for each camera as well as any other ROIs, directional lines or tripwires that the user has defined. The user can define additional ROIs, directional lines or tripwires directly from the tree. ROIs, directional lines and tripwires that are used in saved queries cannot be modified or deleted.

The Report Options area 230 enables the user to select a variety of additional options relevant to the type of query selected. All report types enable the user to select either a bar chart or a line graph. Bar charts display the number of shoppers counted in the camera/ROI over a specific time range. Line graphs display the results over a selected continuous time span, with an hourly/daily resolution depending on the time span selected. The "Cumulative/Average" option in section 320 is available only if the bar chart option is selected and more than one day is selected for the time span. A Cumulative report will show the cumulative number of shoppers who stayed in the ROI for the full time range. For example, 300 shoppers stayed in the ROI for over 60 seconds for the full three days. An Average report will show the average results. For example, if 300 shoppers were in the ROI for over 60 seconds over the full three day period, then on average, 100 shoppers stayed in the area for over 60 seconds across the three days.

The Time Span area 235 enables the user to select the date and time period to be analyzed. The time period can be daily or continuous and may be for a full day (24 hours) or for a specified time during the day. A single day can be Selected by clicking on the day required, for example, Sunday, July 1st. A consecutive range of days can be selected by selecting the first day in the range and then, while pressing the <Shift> button clicking the last day in the range. For example, Sunday, July 1st—Tuesday, July 3rd. Similarly, several non-consecutive days by clicking the first day and then pressing <Ctrl> while clicking on each additional day. For example, Sunday, July 1st, Wednesday, July 4th and Saturday, July 7th. Thus, multiple days, spanning multiple months can be selected.

The Time of Day option is only available if report has been selected to be a Bar Chart. A user can select a full day or select a start and end time for the analysis. If an End time is chosen, the value in the Duration drop-down list is calculated according to the selected Start and End times. Alternately a Start time and a Duration can be selected and the End time is then automatically calculated.

The Recurrence control 240 enables the user to define the number of weekly recurrences the user wants to run the query for the same defined time span. For example, if the user selects June 16 as the time span and set the weekly recurrence to 4, the resulting graph has 4 lines (or 4 bars in a chart) with each line/bar representing the selected time span over 4 recurring Saturdays, starting from Saturday, June 16. If the user selected the time spans June 14, 15 and 16 between the hours of 10:00-12:00 and again chose a weekly recurrence of 4, the resulting graph would have 12 lines/bars (3 lines/bars (days/hours) for each of 4 weeks).

The Queries Pane 205 preferably includes four different control buttons: Generate Report 245; Save New Query 246; Save Over Query 247; and Saved Query List 248.

The Generate Report control button 245 enables a user to generate a report for the query the user has defined/selected. In a preferred embodiment, the user can, immediately after clicking the Generate Report button 245, select and generate a new query while the reports for the former query are still being generated. When the user clicks the Generate Report button 245 a new tab for the report is created in the Reports Viewer area 210 and thumbnails for each element of the report appears in that tab as the report progresses. As further described below, the user can view each thumbnail as it appears and does not have to wait for the entire report to complete before viewing any individual aspect of the report.

The Save New Query control button 246 enables a user to save queries that the user has defined for future use. When the user clicks Save New Query button 246 a dialog box appears enabling the user to give the query a title and enter a narrative description of the query.

The Save Over Query button 247 enables a user to save the query that the user has defined or modified over an existing query. When the user clicks Save Over Query button 248, a Saved Query List dialog box appears and the user can then select the query the user wants to overwrite.

The Saved Query List button 248 enables a user to manage saved queries. When the user clicks Saved Query List control button 248, the Saved Query List dialog box appears. This dialog box enables the user to select queries for editing and also enables the user to change the order in which saved queries are displayed in the Saved Query drop-down list.

The Reports Viewer 210, located on the right half of the application window 200 as illustrated in FIG. 2 has three main tabs: Stores 250; Maps 255 and Reports 260.

The Stores tab 250 displays a geographical map 265 of the region where the stores are located. A tool-tip bubble 270 indicates the location of each store on the map. The background color of the tool-tip 270 indicates if the store is currently visible in the Regions 225 tree. [Question to inventors—Does the fact that a store is not in the Regions tree 225 indicate that there is no metadata in the system from that store?]. In a preferred embodiment, color coding the tool tip 270 with the color green indicates that the store is visible in the Regions tree 225 and white indicates that it is not visible in the Regions tree 225. If the user clicks on a green tool-tip 270, the relevant store is highlighted in the Regions 225 tree. Right-clicking on a tool-tip 270 changes the visibility state of the store in the Regions 225 tree.

Figure 3A:
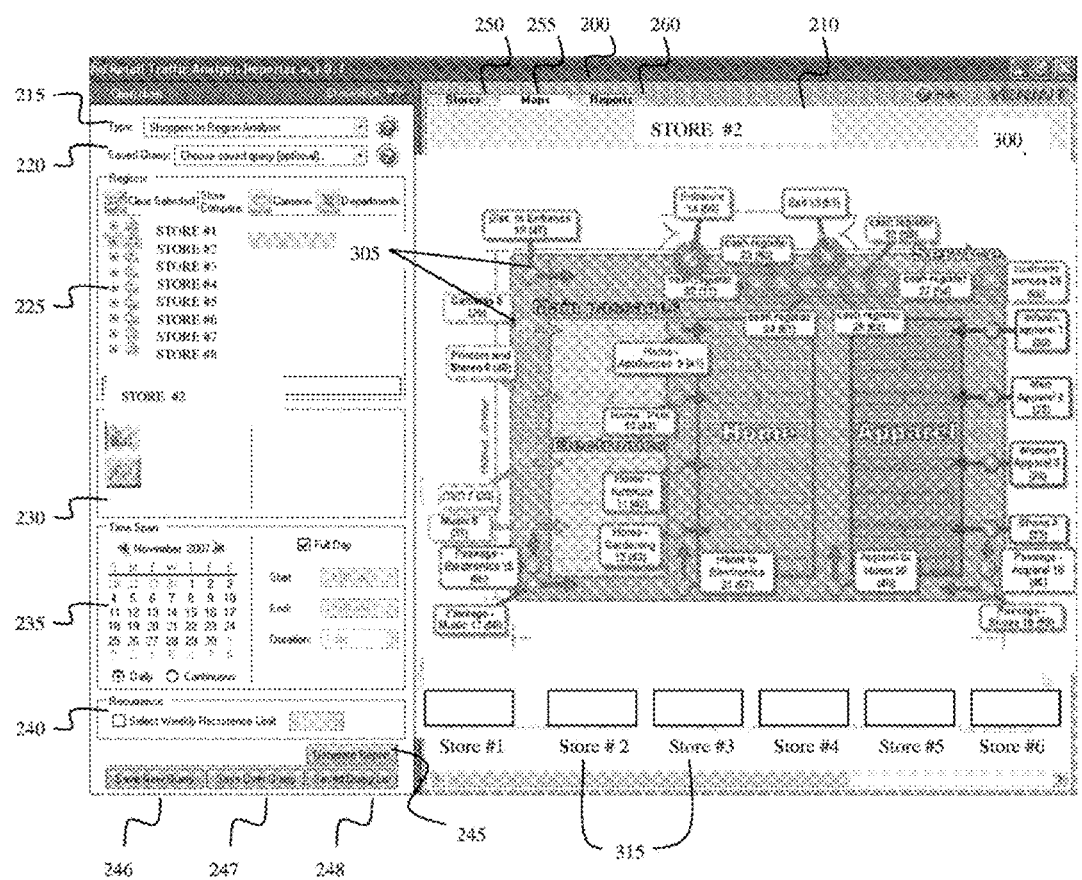
FIG. 3A illustrates a map of a retail location depicting camera locations.
Figure 3B:
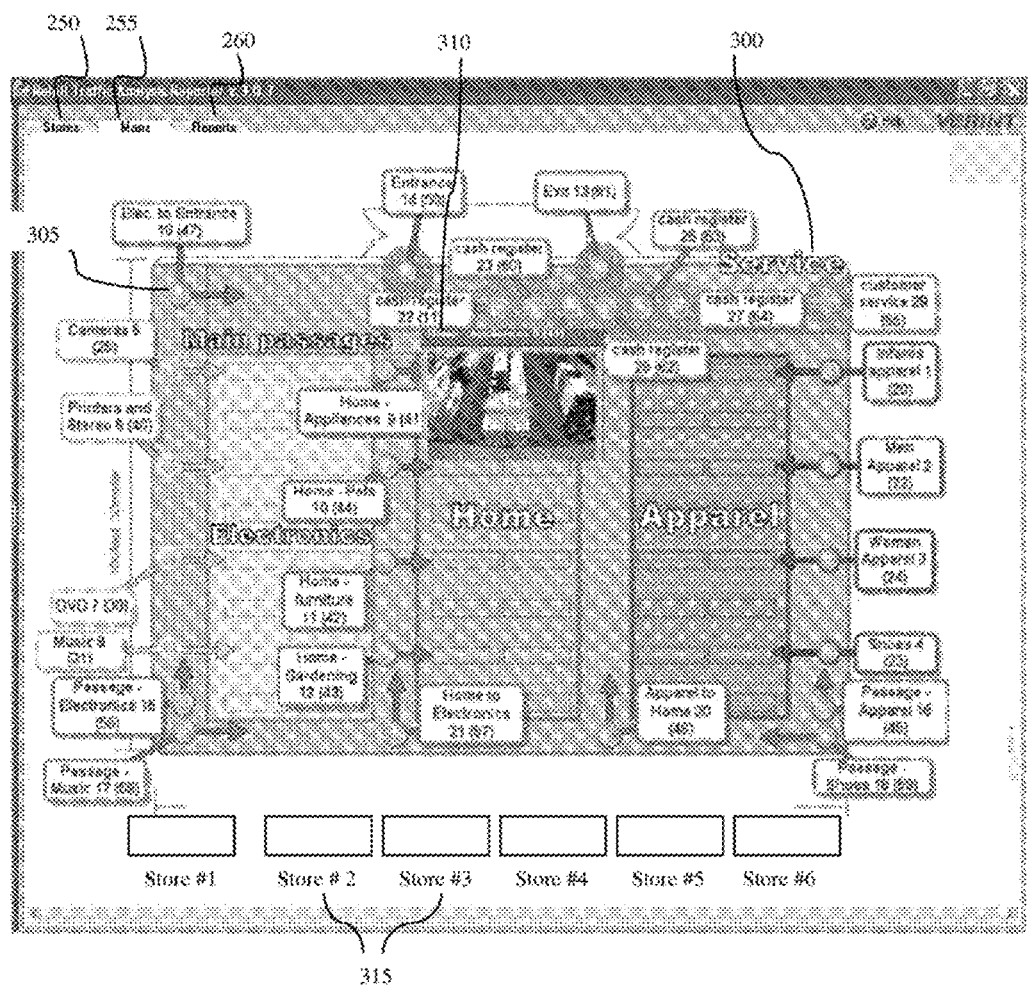
FIG. 3B depicts a map of a retail location including a thumbnail of a camera view.

As illustrated in FIG. 3A, the Maps tab 255 is capable of displaying a Store Map 300 in Reports Viewer area 210. The map 300 illustrated in FIG. 3 is a map of an entire store and maps of each of the departments in the store. All the installed cameras 305 are shown on these maps together with a description and a number that can be traced back to the tree in the Regions section 225 of the Queries Pane 205. When the user clicks on a camera 305 in the map, the selected camera 305 is highlighted in the Regions 225 tree. As shown in FIG. 3B, if the user moves the mouse over any camera position 305, he/she is shown a thumbnail 310 of the camera view for that camera. The icon for a camera 305 preferably also includes the direction that the camera faces As further shown in FIG. 3B, the Maps tab 255 is preferably divided into two sections, an upper section that shows the map 300 of the selected store (in the Regions 225 tree) and a lower section that shows thumbnail maps 315 of all the stores currently appearing in the Stores tab 250. The upper section also has Department tabs 320 for each department in the store. Clicking on a tab 320 causes the system to display a map of the selected department in the upper section.

The user can select a store map by either clicking on the store in the Regions 225 tree, clicking on the thumbnail map 315 of the store in the Maps tab 255 or by clicking on the store's tool-tip bubble 270 in the Stores tab 250 (see FIG. 2). In the example shown in FIG. 3, the Store #2 is selected in both the Regions tree 225 and in the lower section of the Maps tab 255.

Figure 4:
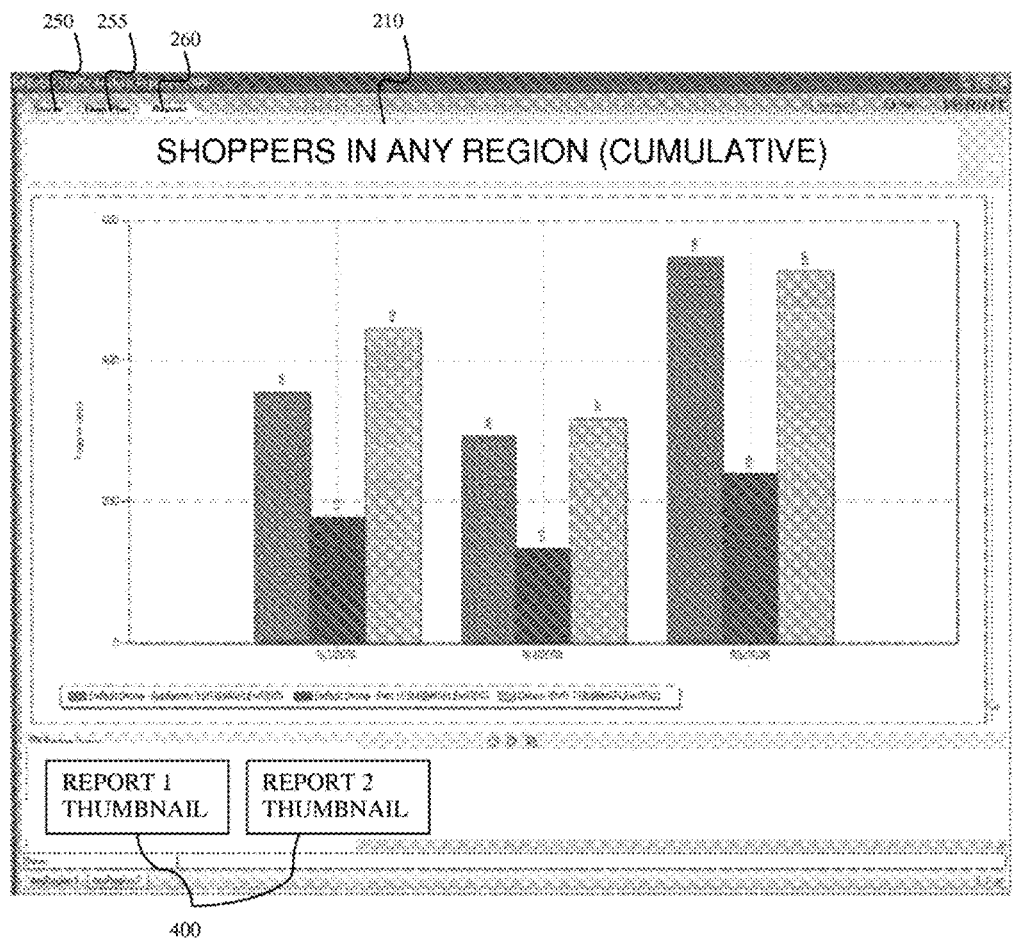
FIG. 4 is an output of the Shoppers in Region Analysis in bar chart form.

As shown in FIG. 4, the Reports tab 260 is the area in Graphical User Interface in which the system displays results of the different analyses performed on the video metadata. All the images that comprise a report are shown as thumbnails 400 in a film strip at the bottom of the tab. When the user clicks on a thumbnail 400 the full image is displayed in on the main viewing area of Reports Viewing Area 210. The user can preferably export any of the reports generated. When this feature is used, the raw data is preferably exported to an Excel file while the images are preferably exported to .jpg format. Reports remain in the tab 260 as long as the application is running. Closing the application removes the reports from the viewer. Before the viewer is closed a warning message is displayed if there are any reports that have not been exported. The user can then choose to export these reports before the viewer closes.

As shown in FIG. 4, the user can hide the Queries Pane 205 area (see FIG. 3A) and consequently expand the viewer area 210 in the Report tab 260, Stored tab 250 or Maps tab 255 by clicking on the vertical bar between the Queries Pane 205 and the viewer area 210. If the user clicks on the vertical bar again, the Queries Pane 205 area is shown. FIG. 4 is an example of the Report Viewer area 210 of the Reports tab 260 for a Shopper in Region Analysis after the Queries Pane 205 has been hidden. The Reports tab 260 has a slider 405 on the right side of the graph area that enables the user to change the size of the graph area and consequently change the size of or remove the legend from the visible area.

As previously described, the Queries Pane 205 contains a Regions tree 225 (see FIGS. 2 and 3A). The Regions tree 225 lists the stores illustrated in the Stores tab 250 and within each store shows hierarchical structure of the store in terms of the departments in the specific stores and the deployment of cameras in each department. Each camera in the tree has a default ROI defined. The tree structure 225 also shows additional ROIs, "Directions" and "Tripwires" that may be defined. Each of these elements is described below.

Figure 5:
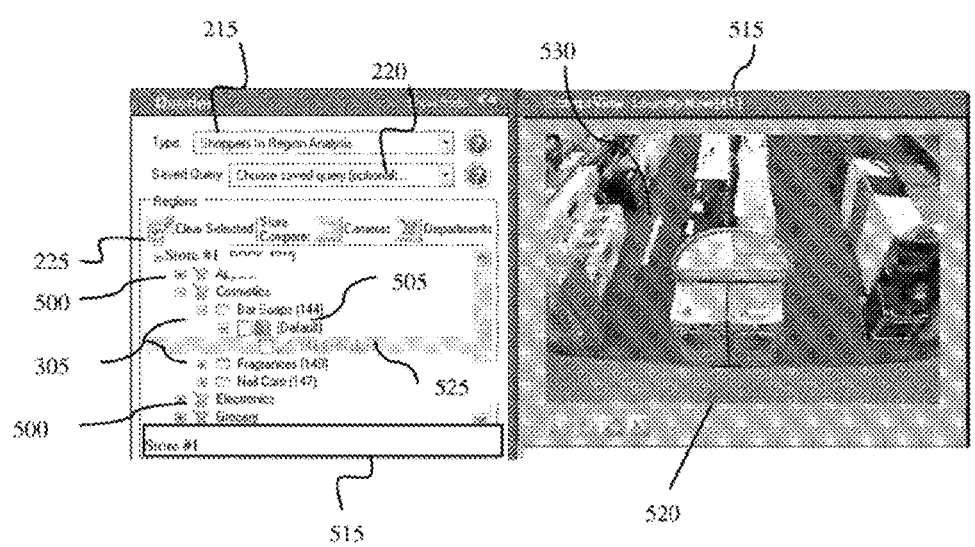
FIG. 5 illustrates an ROI in a camera view, including a directional arrow.

FIG. 5 is an example of the Regions tree 225 listing the hierarchical structure of the departments 500, cameras 305 (See FIG. 3), Regions of Interest 505, and directions installed in the Store #1. As previously described, a ROI is a defined area in the cameras view. The default ROI forms the basis of all of the analysis by the system on the metadata from a camera and all new ROIs that the user defines must fall within the default ROI to be included in this analysis.

The label area 510 at the bottom of the Regions tree 225 area 225 displays the name of the currently selected branch in the Regions tree 225. In the above example, Store #1 is selected in the Regions tree 225 and is also displayed in the label area. Detailed maps of each department can also be accessed from the respective department sub-tab in the Maps tab 255 (see FIG. 3). Departments comprise the second level in the Regions tree 225.

As shown in FIG. 5, by selecting a particular camera in the Regions tree 225, the user can obtain a camera view 515 for any of the cameras in the Regions tree 225. Camera view 515 illustrated in FIG. 5 shows the view of the camera in the dental section of the Cosmetics department in Store #1. The default ROI 520 for this camera is aisle floor in the camera image 515. The names of the cameras 305 installed in the store are shown as the third level in the Regions tree 225 hierarchy 225. Cameras 305 are also preferably predefined with the system.

The camera 305 name in the Regions tree 225 matches the camera 305 name shown on a map in the Maps tab 255 (for example, store map 300 in FIG. 3). When the user clicks on a camera in a map (store or department), the relevant camera in the Regions tree 225 255 is highlighted.

An ROI 505, which is the fourth level in the Regions tree 225 hierarchy, is a defined area within the camera's field of vision. The default ROI 520 for each camera view forms the basis for all analysis on this camera 305. The system enables the user to define additional ROIs for each camera if a particular type of analysis is required.

In a preferred embodiment, the default ROI 520 is the largest area of the camera's field of view that would have foot traffic, and thus video metadata that can be analyzed. The present invention preferably has default ROIs 520 defined for each camera. It should be noted that ROIs are only activated in the Regions tree 225 if the report type selected is either a Shoppers In Region Analysis report or a Dwell Time Analysis report.

A default ROI for each camera is preferable exists and forms the basis for all analysis on this camera. If a ROI that the user wants to use does not exist, it must be created. The user can define additional ROIs for each camera. Any additional ROI is preferably derivative of the default ROI and as should be drawn inside the default ROI. If the user defines a new ROI that is completely outside the default ROI, it is preferably ignored for analysis purposes. If the new ROI falls partially outside the default ROI, it is "cut" and only that portion of the ROI that falls within the default ROI is analyzed.

The ROI can be in any polygon shape that must have at least three sides. After drawing a new ROI it can be repositioned by dragging it to a new location in the default ROI. The user can also change the shape of the new ROI by dragging any of the corner points to new positions. The position and size of any ROI other than the default ROI can be changed. If the ROI that is desired to be changed is used in a saved query, a confirmation dialog box appears listing the saved queries using the selected ROI and the user is asked to his/her action before proceeding.

ROIs can be edited from the Regions tree 225, by right-clicking on the ROI to be edited and select Edit Region from the right-click menu that appears. A Camera View window appears showing the selected ROI as it is positioned inside its default ROI. The ROI can be dragged to a new position using a polygon drawing tool. The edited ROI can be saved by clicking "save." Any ROI other than the default ROI can be deleted. If the ROI to be deleted is used in a saved query, a confirmation dialog box appears listing the saved queries using the selected ROI and the user is asked to confirm his/her action before proceeding. Any ROI other than the default ROI can be renamed.

Returning to FIG. 5, Directions 525 are the fifth level in the Regions tree 225. By selecting a direction for the ROI 520 the user can, depending on the report type selected, obtain an analysis of the shopper traffic moving in that direction through the ROI 520. In the example illustrated in FIG. 5, a directional arrow 530 is set to indicate that an analysis may be required of shopper traffic moving in both directions this Dental aisle in the Cosmetics department.

In a preferred embodiment, the directional arrow 530 is defaulted to being one-sided, meaning that shopper traffic is analyzed in one direction. The user can however change the arrow 530 to be two-sided, if required, as illustrated in FIG. 5. No matter where the user draws the directional arrow 530, the system preferably places it in the center of the ROI 520 in which it is drawn.

Directions allow for the analysis of shopper movement that passes through an ROI in a particular direction. The user can place directional arrows 530 (both single and double-sided) in an ROI, which are then used by the application to analyze shopper movement in the indicated direction to produce the Directional Analysis report. Directions are only activated in the Regions tree 225 when this report is selected.

The user can define a new direction in the Regions tree 225. The directional arrow 530 (indicating the direction) can be one or two-sided. If the directional arrow 530 is one-sided then the application tracks shopper movement in the direction of the arrow. If the directional arrow 530 is two-sided, the application tracks shopper movement in both directions. A new direction is defined by the user by right-clicking the ROI for which a new direction is to be defined and select New Direction from the right-click menu that appears. A Camera View window appears showing the selected ROI. The new direction is drawn on the ROI by clicking and dragging the mouse in the desired direction. The user can change the direction of the arrow 530, as well as delete and rename Directions.

Figure 6:
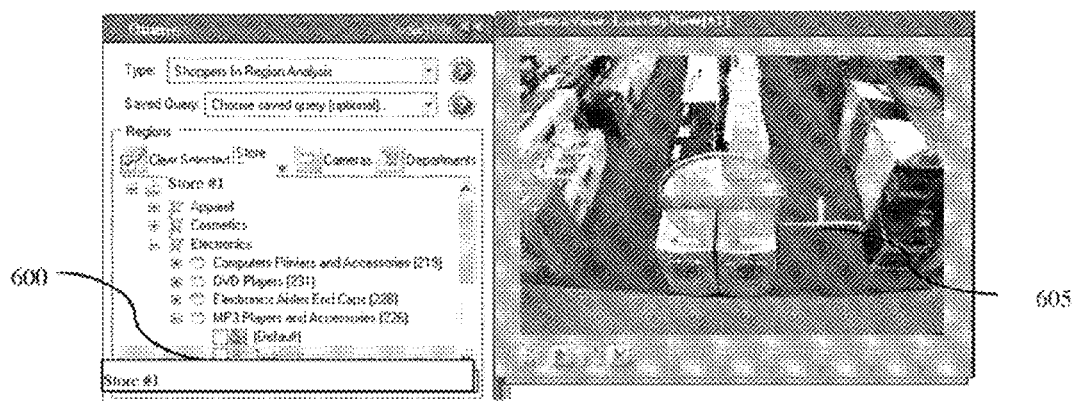
FIG. 6 illustrates an ROI in a camera view, including a tripwire.

Tripwires are virtual lines that can be drawn in an ROI for a camera and are used to analyze shopper traffic crossing the line in a particular direction. FIG. 6 is an example of a tripwire 600 in the Regions tree 225 and the camera view showing the location and direction of the tripwire 605. In the hierarchy, tripwires 600 have the same level as ROIs. If the tripwire does not fall within the ROI, the traffic crossing the tripwire 605 line will not be analyzed.

To define a new tripwire, in the Regions tree 225 right-click the camera for which a new tripwire is to be defined and select New Tripwire from the right-click menu that appears. A Define New Tripwire window appears showing the default ROI. In the default ROI, the new tripwire is drawn by clicking and dragging the mouse to draw a line for the new tripwire. It is most important to position the tripwire in precisely at the right place. The tripwire should also be drawn to the correct length so as to "catch" all the shoppers entering the region. Unlike a directional arrow 530 as described above in regard to FIG. 5, a tripwire remains in the position in which it is drawn and is not automatically centered in an ROI.

A user can change the direction or position of the tripwire. If the tripwire that is to be changed is used in a saved query, a confirmation dialog box appears listing the saved queries using the selected tripwire and the user is asked to confirm his/her action before proceeding. A with Directions discussed above, tripwires can be deleted and renamed.

Thus far, the basic structure of the GUI of the system of the present invention has been described. Next, the method of running queries on video metadata using the system will be explained.

The method and system of the present invention enables the user to execute and obtain an analysis of shopper patterns by applying a combination of parameters for different report types. New queries can be created and saved and the user can also modify a saved query and save it either as a new query or by overwriting the saved query.

The following describes each report type and how to run, and if required, modify a saved query. In addition the following describes how to manage the list of saved queries and, if required, change the order in which the saved queries are shown in the Queries Pane 205. The Regions tree 225 displays the stores currently selected in the Stores tab 250. However, when loading a saved query or restoring a query, the Regions tree 225 is automatically updated to present the list of stores that were visible when the query was saved or executed. This mechanism can also be used for defining interesting groups of stores and saving a group as an empty query for future use.

The reports generated for any query are viewed in the Reports Viewer area 210 (see FIG. 4). Each new report generated includes the name or names of the stores included in that report. The report appears in a new tab in the Reports Viewer 210 and remains there until the application window is closed. If the user wants to retain the information displayed in a report the user preferably exports the report as described in the Viewing/Exporting Reports discussed below. If the user attempts to close the application window when there are unsaved reports, a warning message is displayed giving the user the opportunity to save the unsaved reports or continue with the close procedure.

The system and method of the present invention enables the user to select stores for which the user wants to generate reports. The user can select as many stores as required. In a preferred embodiment, a query can process up to forty two data sets per report. To select stores a user selects the Stores tab 250 as shown in FIG. 2 and right-clicks on the name of the store (e.g. 270) to be selected in the stores map 265. The tooltip bubble 270 changes to green and the store name appears in the Regions tree 225 in the Query pane 205. The user can repeat this process for all the stores to be included in the Regions tree 225. To remove a store from the Regions tree 225, right-click on the store's tooltip bubble 270 in the stores map 265. The store is removed from the Regions tree 225 and the tooltip bubble 270 changes to a white background.

Once the stores have been selected for the analysis desired by the user, the user then selects the specific type of analysis and report he/she wants to run. The system and method of the present invention enables the user to select and run queries for the following report types as described above.

"Shoppers In Region Analysis": Enables the user to locate trends in the number of shoppers over time in any specific region. The report can help the user analyze changes in shopper numbers per hour of the day, day of the week or during holidays or promotion campaign days. Full flexibility is provided in selecting a ROI from a specific endcap or shelf to full camera view or even complete departments. By drawing a customized ROI on specific shelf or stand the user can pinpoint the analysis to selected shelf or even a product. A Quick Query feature available for this report enables the user to generate queries that compare cameras in the stores or compare departments in the stores selected in the Stores tab 250 as described above. An example of a bar graph output for a Shoppers In Region Analysis is shown in FIG. 4.

Figure 7:
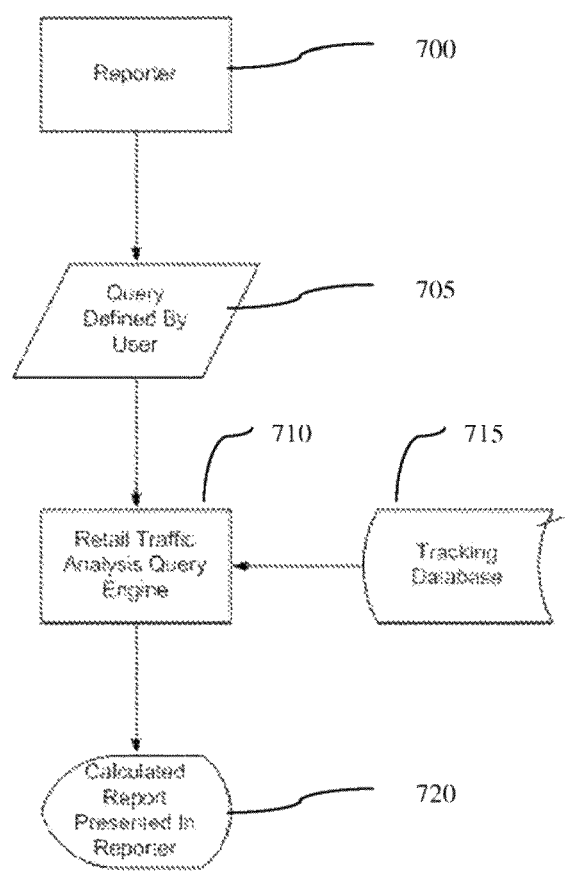
FIG. 7 is dataflow diagram illustrating the flow of data in the main processes of the present invention.

FIG. 7 illustrates the dataflow conducted during the calculation of a query for each of the preferred methods of the present invention: Shoppers In Region Analysis; Dwell Time Analysis; Directional Analysis; and Shoppers Entering Area Analysis. As previously described, the system and method of the present invention analyzes data derived from video streams from video cameras to generate reports on the movement of objects, people, within a defined space. The system processes video clips and outputs trajectories of people moving in each of the cameras. Information of these trajectories is stored in a Tracking Database 714 which enables both relatively low disk-space and high seeks speed for fast queries. In general, each detected object has a unique ID, followed by a timestamp of its first appearance and coordinates of its movements. Each coordinate also includes a delta time-span from the timestamp of the first appearance of the object. The Tracking Database 714 is constantly added with new trajectories information from each of the cameras as time passing by.

The Reporter GUI 700 previously described with respect to FIGS. 2-4 enables the user to define queries to run against the Retail Traffic Analysis (RTA) Query Engine 710. Each query 705 which the user defines using the Reporter GUI 700 is first translated to an Extendible Markup Language (XML) query, which is then sent to the Query Engine 710 for calculation. Once the Query Engine has completed it's processing of the user's query, operating on the data in the Tracking Database 715, and the result is ready, the result is presented to the user in a new report which is opened in a separate tab such as illustrated in FIG. 4. This process enables the user to browse multiple reports simultaneously.

Upon receiving a XML which defines a query 705 the user has defined, the RTA Query Engine 710 starts a calculation procedure. In order to increase the speed of report generation, each camera that is queried is calculated in a separate thread in the RTA Query Engine 710. When the result is ready, it is sent back to the user for presentation 725. The RTA Query Engine 710 queries the Tracking Database 715 for trajectories information according to the query 705 requested. The Tracking Database 715 is indexed in such a way that makes the retrieval of data optimal for most common queries 705.

The Shoppers In Region Analysis provides an object count that represents the number of objects per unit area in a specific time interval. In a preferred embodiment, the objects are people, preferably in a retail store. Using this tool, one can distinguish between regions by their object (people) occupancy. Object count can answer question like how many objects visited a region during a period and what is the pattern of object occupancy on a certain area during a certain time period. As described above, the user of the present system has the ability to define several ROIs within a particular camera view and can thus compare the relative number of shoppers in these respective areas.

This Shoppers In Region Analysis tool has many applications. For example the tool can be used for traffic jam analysis. The system can be set with a certain threshold of number of objects (cars, people . . . ) per unit area per time for traffic jam analysis and monitor areas for capacity overload. The tool can be used plan remodels/resets in a retail environment. Object, people, count qualitative/quantitative observations can be used for examination of different store models (layout/services/management/locations etc) and can serve as infrastructure for store model optimization. The observations of the system of the present invention are unbiased by any human interpretation factors and can be continuously monitored to determine trends and facts. The tool can be used for shelf/aisle/end-cap pricing, to evaluate promotions and provide comparisons between time periods when the promotions were running and when they weren't, and comparisons of foot traffic when shelf/aisle/end-caps are stocked with different products.

If one would like to examine regions for occupancy purposes (in a store environments) the number of people passing by a certain area is a good parameter for estimation area popularity and therefore likelihood for product to be sold. Therefore this information can be served to negotiate pricing of different areas in the store. Questions like popularity comparison between regions (end-caps/aisles) or comparison between periods (sales/holidays/weekend/weekday) or what are the peak hours can be answered on an empirical basis without any bias.

In a warehouse environment, the present tool can be used for optimization of product provision by examining object count patterns, where the monitored objects can be workers in the warehouse or forklifts that are used in the warehouse.

Further, since the system of the present invention is able uniquely identify objects, the system is able to track the person as they travel from area to area (between camera views) throughout the store. This feature of the present invention has particular applicability to security (e.g., tracking a shoplifting suspect) but can also be used to detect consumer preferences, preferred store configuration and various other operational aspects of how a store is configured and operated.

Figure 8:
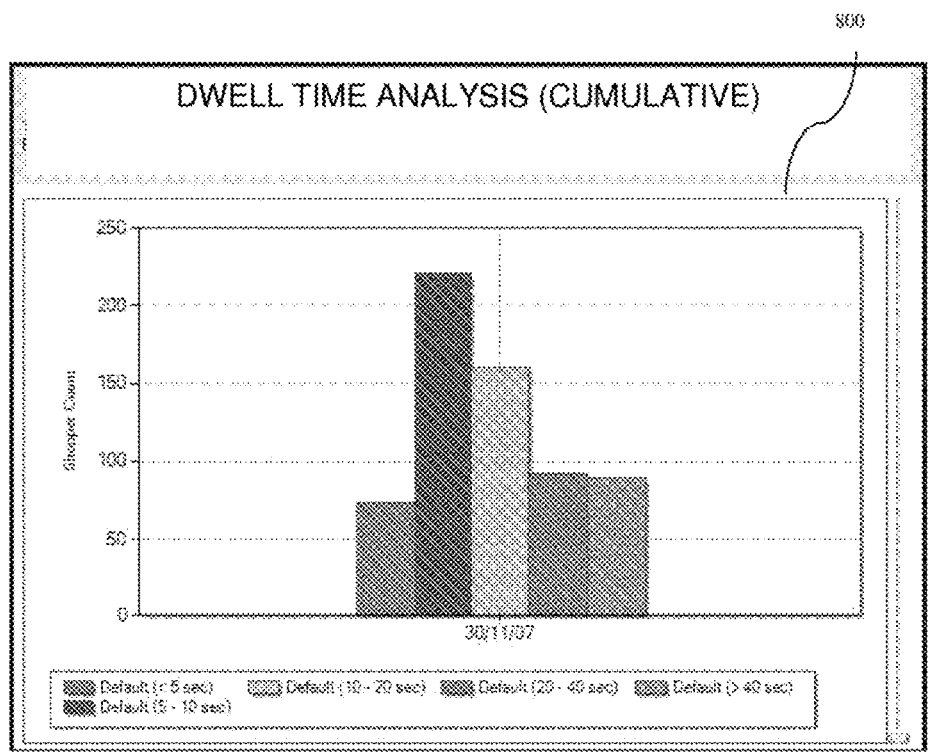
FIG. 8 is an output of the Dwell Time Analysis in bar chart form.

"Dwell Time Analysis": Displays the number of shoppers that "dwell" in a particular area over a defined time period. For example, the number of shoppers who remained in the ROI in the area for more than 20 seconds but less than 40 seconds. Only single cameras can be selected for this query type, but in a single camera it is possible to compare several ROIs. As shown in FIG. 8, a bar graph 800 can be used to show the results of the dwell time analysis in the Report Viewer 210 (see FIG. 2). In addition to bar chart that is produced by the Dwell Time Analysis report a line chart (not illustrated) can be used to display the Dwell Time Analysis.

Figure 9:
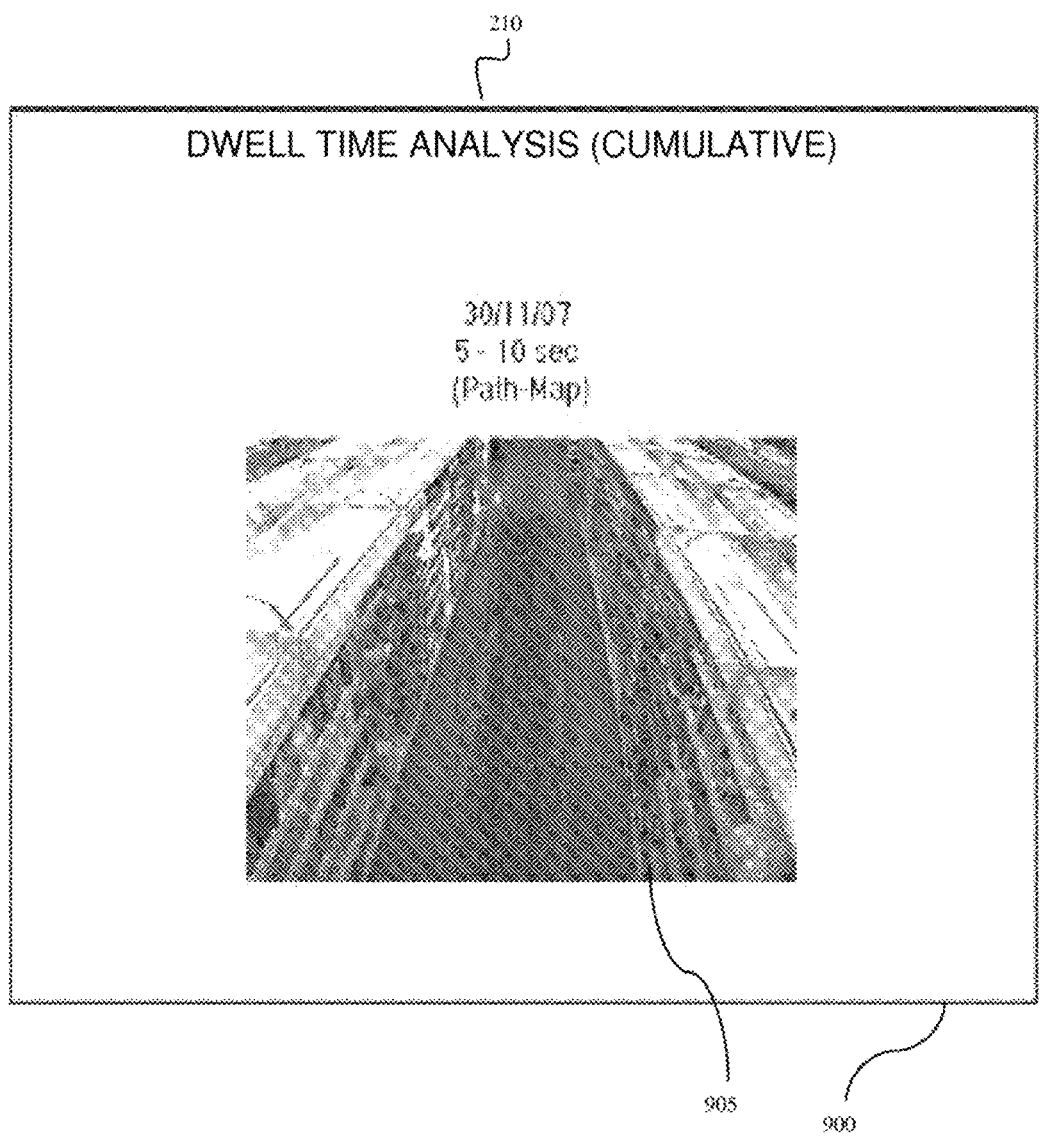
FIG. 9 is an output of the Dwell Time Analysis in a path map form.

Further, the user can also select to have a Path Map or "Heat" Map produced for the same time period. As shown in FIG. 9, the Path Map 900 is a superimposed over a still image of the ROI and shows the paths 905 of the objects that were in the ROI for the selected time frame and dwell time. If the time period selected by the user is too long, the image in the report may be saturated with the path lines 905. Thus, it is preferred to use shorter time periods for each query and repeat the query several times to find the preferred time resolution.

Figure 10:
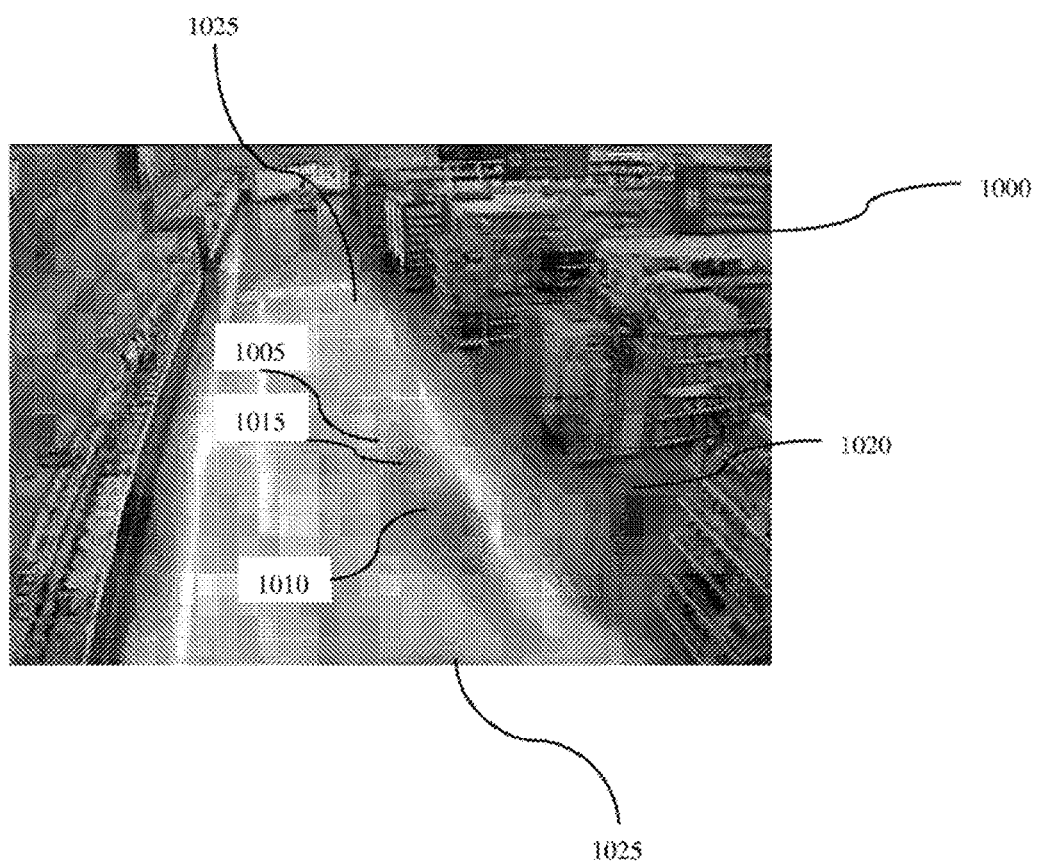
FIG. 10 is an output of the Dwell Time Analysis in a heat map form.

MIKE The Dwell Time Analysis can also generate a Heat map 1000 as illustrated in FIG. 10. As illustrated in FIG. 10, the heat map provides "heat" indications superimposed over a still picture of the ROI and shows the density of objects in the ROI for the selected time frame and dwell time. As used herein, "heat" indicates the amount of time an object (a person), remains (dwells) in a particular location. The Dwell Time Analysis report thus enables the user to understand shopper's activity in a specific ROI. A strong correlation exists between the dwelling time of a shopper in a certain ROI and the shopper's activity (e.g., making a purchase).

In the preferred embodiment, the heat map 1000 shows the number of shoppers that spent the selected amount of time in the physical area. Areas that experienced the same number of shoppers during the selected time frame are connected by contour lines, similar to a topographic or isobaric map. FIG. 10 shows an example of a 10-20 seconds dwell time heat map 1000 of aisle 1025. Note, this map only shows shoppers that spent more than 10 seconds and less than 20 seconds in the ROI of aisle 1025. If the shopper spent less than 10 seconds in this ROI—their activity is not illustrated in this heat map 1000. Similarly, if the shopper spent more than 20 seconds in the ROI, they are not represented in this heat map. Again, the heat maps 1000 of the preferred embodiment show the number of shoppers for a selected range of dwell times, the heat maps do not map the actual dwell times of the shoppers themselves.

A short dwell time usually indicates that shopper is walking. For example, 5-10 seconds in a short aisle or 10-20 seconds in a long action alley. The user can easily see that the area with the most traffic 1005 is the walking passage, as expected. Most people who remained in this ROI for less than 20 seconds were just passing through. More specifically, part 1010 of the heat map 1000 is the area in which most of the people who spent 10-20 seconds in this ROI spent their time. Fewer shoppers spent less than 20 seconds in area 1015.

It is noted that this area 1010 is across from aisle 1020. One conclusion that can be drawn from the particular dwell time analysis shown in FIG. 10 is that aisle 1020 is one of the main aisles in the store by which customers travel to get to aisle 1025. This conclusion could be confirmed by performing a Shoppers In Region Analysis as describe herein.

Figure 11:
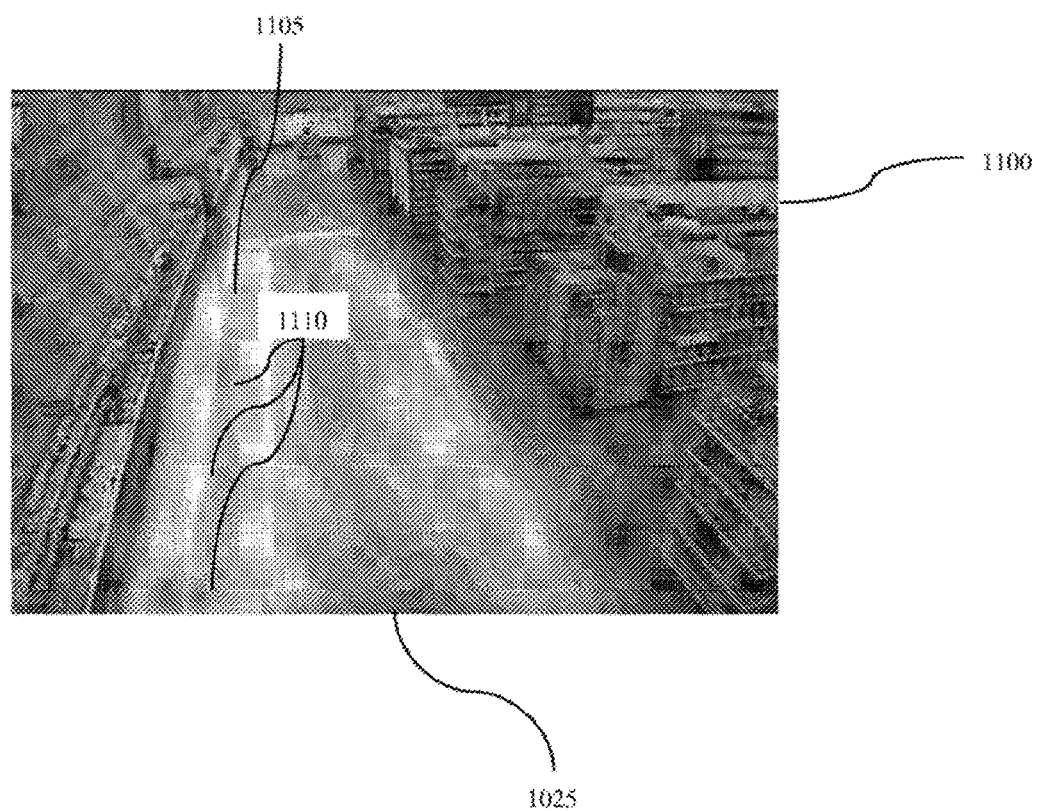
FIG. 11 is a further output of the Dwell Time Analysis in a heat map form.

Long dwell time of shoppers near produce table or shelves usually refers to a buying activity or at least high interest in a product. For example, 20-40 seconds in a short aisle or more than 40 seconds in a long alley. FIG. 11 shows an example of a >40 seconds heat map 1100 of the same aisle 1025 as illustrated in FIG. 10. It can be seen that most of the people that remained in this ROI more than 40 seconds were busy with a buying activity near the refrigerators 1105. The darkest locations 1110 denote the hottest ones—meaning that more shoppers spent more than 40 seconds at these particular locations in aisle 925.

The Dwell Time Analysis tool of the present invention can answer question like how many object which visited a region during a period stayed in this region for a certain amount of time. This type of query gives insights on the object count query because it tells how many objects which were counted stayed in the region certain amount of time. This type of information is very useful for visualize the hot-spots in a store and it could also be presented over the floor-plan of the store to identify hot-spots over the entire store at once. Further, one can easily spot traffic jams using this type of query (long and narrow areas that are highly occupied—red).

Dwell time analysis provides insights about object temporal behavior patterns. Therefore a user of the present invention can plan resets and remodels by analyzing behavior patterns in different stores and in different times (hours, days, etc.). The dwell time information is essential when trying to estimate effectiveness of different areas of the store (shelves, aisles and end-caps), to evaluate the attractiveness of certain products over the others or to evaluate how effective promotions are by comparing same spot over different times of a campaign.

Figure 12:
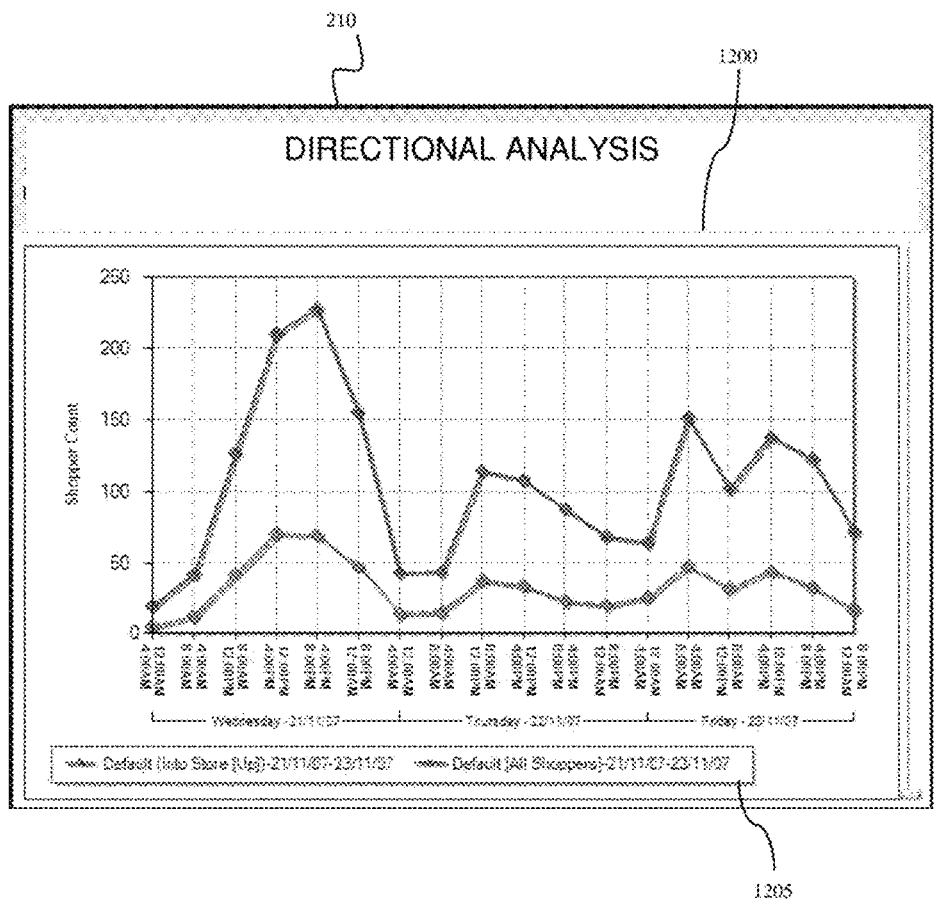
FIG. 12 is an output of the Directional Analysis in a line graph form.

The Directional Analysis method of the present invention generates an analysis of the flow of shoppers within the store and more specifically, the directions in which the shoppers move with the areas of the store. In a preferred embodiment, only single cameras are selected for this type of analysis, but in a single camera it is possible to compare several directions for each ROI. FIG. 12 illustrates a line graph 1200 showing the results of a directional analysis. When Continuous is selected in the Time Span area (see 235, FIG. 2), a legend 1205 is displayed below the line graph 1200 showing the breaks between dates selected for the report (as shown in FIG. 12). If this option is selected with the Recurrence feature (see 240, FIG. 2), the legend only shows the separation of days and not dates. A Path Map similar to that shown for the Dwell Time Analysis report discussed above can also be created for this report, if required.

Using the user-defined directions as previously described, a user can generate queries that filter the data according to specific direction at a specific area of interest. Combining several directions can produce a comparison which encapsulates highly innovative information. This Directional Analysis tool of the present invention can be used to gather information regarding common paths, patterns of movements, design of floor plan, etc. For instance, a comparison between shoppers moving up or down the aisle can be generated.

In more complex situations, a Directional Analysis query can be defined to investigate a specific junction at the store—counting the number of shoppers turned to every direction. The result is presented to the user in different kind of charts according to what was defined in the query.

The Directional Analysis represents the number of object per unit area on a specific time interval that moved to a certain direction. Therefore by this observation one can distinguish between regions by their object movement. Directional analysis can answer question like how many objects, people, which visited a region during a period moved to certain direction and what is the pattern of object motion in a certain area during a certain period. This Directional Analysis query gives insights on the object count query because it tells how many objects which were counted moved to a chosen direction.

The Directional Analysis tool can also be used for traffic jam analysis. One interested in traffic jam can use this query to provide information about potential traffic jams due to certain directional movement patterns. The Directional Analysis tool can also be used to plan resets/remodels given that it provides insights about traffic patterns. Therefore store models can be investigated by its traffic measurement. Further the Directional Analysis tool can be used for shelves pricing and promotions. Traffic flow patterns can be compared and provide reasons for difference between object count measurement and hence for popularity of store spaces. In the retail environment the Directional Analysis tool can answer questions like path popularity. In the warehouse environment, the Directional Analysis tool can be used for optimization of product provision by examining product path and flow in the warehouse.

Figure 13:
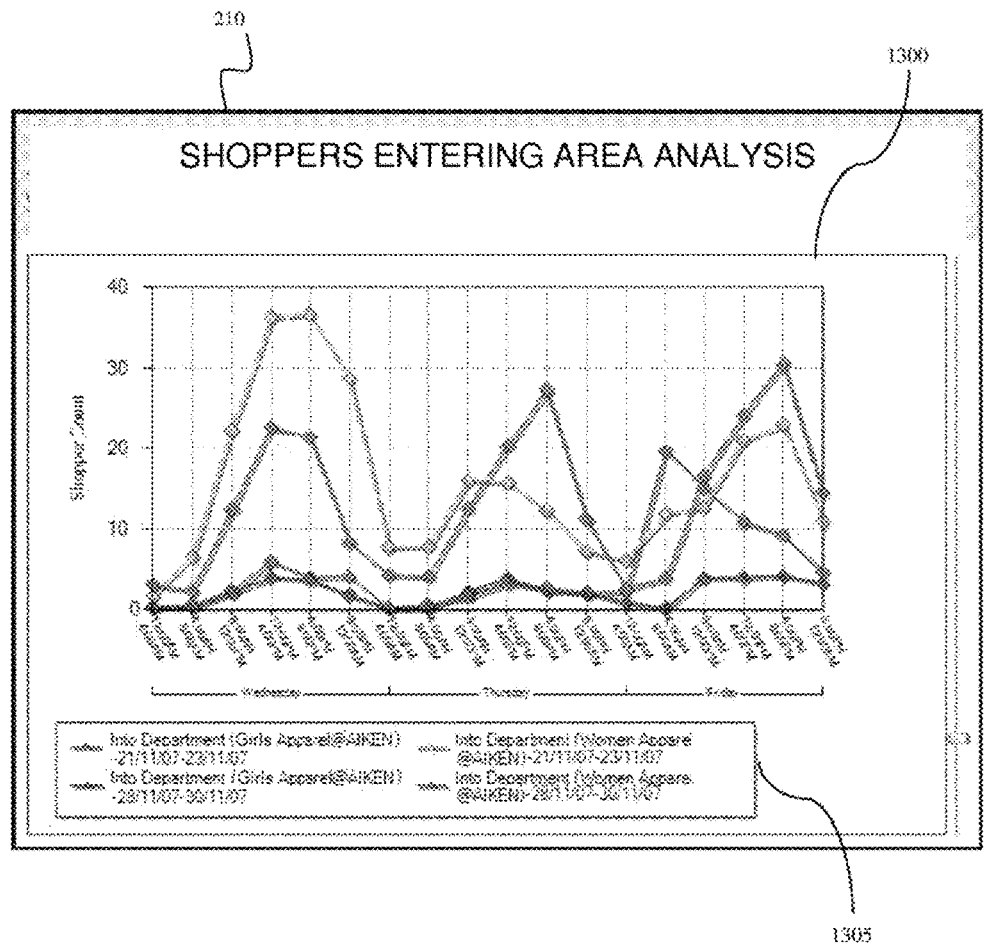
FIG. 13 is an output of the Shoppers Entering Area Analysis in a line graph form.

The Shoppers Entering Area Analysis components of the system and the method of the present invention generates and displays an analysis of the number of shoppers who enter a specific store area or department by crossing a virtual line. FIG. 13 illustrates a line graph 1300 showing the results of a shoppers entering area analysis. If the user wants to compare the number of shoppers present in more than one area, multiple cameras/virtual lines can be selected. When Continuous is selected in the Time Span area (see 235, FIG. 2), a legend 1305 is displayed below the line graph 1300 showing the breaks between dates selected for the report. In the above example of FIG. 13, the Recurrence feature (see 240, FIG. 2) is also selected and the legend 1305 shows the separation of days in the graph.

The Shoppers Entering Area Analysis query shows only shoppers that were observed crossing a virtual line (tripwire) on the ground floor. A graphical interface allows a user of the present invention to define a tripwire under each of the available cameras and select these tripwires to be queried. As described above, a tripwire is simply a virtual line with a direction indicator which defines the requested crossing direction. Only shoppers crossing this line in the specified direction will be counted in this type of query.

Employing these user-defined tripwires, a user of the present invention can generate queries which will filter the data according to specific crossing directions. Combining several tripwires can produce an accurate counting of shoppers entering/exiting a specific area or department. The Shoppers Entering Area Analysis tool can be used to count the number of shoppers entered into the store or even to a specific department inside the store, if all entrances to the department are covered with cameras. As with the other queries, the result is presented to the user in different kind of charts according to what was defined in the query.

Shoppers Entering Area Analysis can answer question like how many object moved from one area to another area via certain place (line). This query gives information on traffic flow like directional analysis but different from directional analysis in that it looks for object crossing line and not all the objects in a certain region that are moving in a general direction. This query also provides information on traffic flow and therefore the same issues for directional analysis are valid for this query.

In operation, the system and the method of the present invention is driven by a user's query of the data stored in the database. The following describes how to define new queries or modify a saved query. A query is comprised of four parameters. The following sections describe how to define and use each of these parameters when defining queries. Defining Regions tree options; Defining Report Options; Defining Time Span Options; and Defining Recurrence Options.

The values that can be selected for any of the above parameters differ according to report type. For example, the options available for a Dwell time Analysis report are not necessarily also available for a Shoppers In Region Analysis report. In a preferred embodiment fields on the user's interface are grayed out (not available) in any of the parameter areas, if that field is not available for that report type.

A query can include cameras from different stores however in a preferred embodiment a query can only have up to 42 data series per report. A message is displayed if the user exceeds this preferred number, notifying the user that the report cannot be generated. The first step in defining a query is to select the store(s) that are to be included in the query.

The following procedures describe how to define new parameters for a new query in the preferred embodiment. The same procedures are followed to modify any of the parameters in a saved query. To define a query: 1) Select the store(s) for the query; 2) Select a report type; 3) Define the Regions parameters; 4) Define the Report Options parameters; 5) Define the Time Span parameters; and 6) Define the Recurrence parameters.

The following are some preferred guidelines for defining or modifying queries and allow the user to obtain more accurate results for any analysis performed by the system and method of the present invention. These guidelines relate to the following: (1) Margins; (2) Perspective; (3) Shopper Count; (4) Dwell Time; and (5) Directional Analysis In regard to margins, Shoppers (objects) that are close to the margins of the default ROI can be "cut" out of the processing area. For better accuracy it is preferred that the user define ROIs and tripwires away from the margins and as close to the center of the default ROI as possible. When the user defines ROIs and tripwires, the perspective in relation to the camera must also be considered. A new ROI should be drawn inside the default ROI. Any part of an ROI that is outside the default ROI is not considered when performing an analysis of the ROI.

With respect to perspective, when the user defines an ROI or a tripwire the user should be aware of perspective distortion. Items that are far away in the camera view (towards the horizon) are smaller and tend to be less visible to the camera. For better accuracy it is preferred that the user defines ROIs and tripwires as close to the camera as possible, but not too close to the margins of the default ROI.

In regard to Shopper Count, when a query is performed on an entire department or on a group of cameras, there could be a certain amount of overlapping with some of the shoppers appearing in more than one camera. For example, if the user defines a query and selects five cameras in the cosmetics department but only one camera in the grocery department, the results may show more shoppers in the cosmetics department. This doesn't necessarily mean that there were actually more people in the cosmetics department in that time frame. In addition, the report may show more shoppers in the cosmetics department in that time frame than were actually present, due to the overlapping of the cameras.

With respect to Dwell Time, a Heat Map can be produced as part of a Dwell Time Analysis report. The Heat Map shows where most of the activity occurs and is comprised of two images: the original view of the camera; and the density of the shoppers (objects) in view. The image showing the density of the shoppers is placed over the original view of the camera to produce the Heat Map. Each point in the second image (the density map) is a count of the number of shoppers (objects) multiplied by the time (in seconds) that these shoppers remained in this particular location for the specified time. By generating a Heat Map on the default ROI, the user is able to recognize the hot spots in the camera view. The data displayed in the Heat Map (density map) is relative to the entire ROI. In a preferred embodiment a user sets a specific, small, ROI to answer specific questions. For example, if the user wants to know how many people were dwelling in front of an end-cap, the region should be set just in front of that end-cap.

When defining a query to produce a Direction Analysis report, in the preferred embodiment, only shoppers that perform a substantial movement in the desired direction are counted. For the purposes of this report in the preferred embodiment, substantial movement is any movement that is more than 10% of the image size.

A further aspect of the present invention is the connectivity and integration of the RTA system, described in detail above, and the video data on which the RTA operates. As described above, the RTA tool creates reports based on meta-data that was generated from raw video data that was recorded in retails stores 105 (see FIG. 1). According to the further aspect of the present invention, a user, when viewing a report generated by the RTA tool, can click on the relevant portion of the report and retrieve and launch the raw video from the camera that generated the date reflected in the report.

Figure 14A:
FIG. 14A depicts a path map report and FIG. 14B illustrates the same path report integrated with the video that generated the data for the path map.
Figure 14B:

For example, FIG. 14A illustrates a path map report similar to the one illustrated in FIG. 9. If the user clicks on the path, she is able to launch the video, as illustrated in FIG. 14B, depicting the movement of the actual person traversing the same path that is described by the path map. Naturally, only a single frame of the video is illustrated in FIG. 14B, but one can appreciate that this video is presented to the user as full motion video for the time span selected by the user for the path map report. The video launching can be done by clicking the trajectory itself in the thumbnail image (right click->launch video) or by selecting it from a list of all trajectories in the relevant report.

The same ability to view the full video applies to the other reports described herein as well. When a user detects a long dwell time in a certain place (red spot in the dwell image), the user can instruct the system to connect to the Video Management System (element 115 in FIG. 1) as described above and the system extracts the video clips that describe the people standing in that specified location.

The present invention also provides for the launching of the raw video from a graphical report. While viewing a bar-chart of a certain time, or a line graph, the user can click a data spot in the graph to launch the relevant video clip from the graph. For example if a user clicked the line chart of FIG. 9 on a portion of the chart that described 20 people going to the right at a certain location, the system would present the user with 20 different video clips depicting the 20 people in the ROI for that camera moving in that direction.

The connectivity to the Video Management System (VMS) 115 from the Retail Traffic Analyzer 125 (see FIG. 1) is done by using an API (Application program interface) that is provided by the VMS 115 itself. The VMS 115 allows the system to retrieve a stream of video from a specified camera in a certain time range. Knowing where the user clicked on a particular report/map, the system knows what camera to ask and what time range is desired by the user and the system simply asks the VMS 115 for the video clips corresponding to the specified camera for the specified time frame. Once the RTA 125 receives this video data, it opens a video viewer window that lets the user view and control the video she requested. This feature enhances the RTA 125, making the experience more intuitive and the reports more powerful. A power user or an analyst can now benefit much more from the reporting system due to the fact that every piece of information can be investigated quickly to understand what was going on and why.

For example, if a user sees strange activity in the middle of the night (many people in one place) the user can just click the report and watch the video describing irregular movement of shopper or employees in that spot. It also makes the VMS 115 system more powerful, allowing the user to find what she are looking for using the RTA 125 without having to browse through hours of raw video. If the user is looking for some activity near the meat refrigerator between 10-11 AM, the user can simply generate a report for that camera during that time range and get all clips describing only people in a certain location in the video without having to watch an entire hour of video.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method operable on a computer that is coupled to a memory containing video data of as prescribed physical area, the method responsive to the movement of objects in the prescribed physical area, the method comprising:
   receiving video data of the prescribed physical area;
   identifying objects in the prescribed physical area by querying the video data, wherein the objects that are identified are moving in the prescribed physical area;
   displaying a static visually perceptible report related to the identified objects;
   determining video data that is related to the identified objects;
   displaying the determined video data simultaneously with the display of the static visually perceptible report, wherein the static visually perceptible report is selectively superimposed upon or displayed adjacent to the determined video data.

2. The method according to claim 1, wherein the received video data is compressed video data.

3. The method according to claim 1, wherein the determined video data is full motion video data.

4. A method operable on a computer to detect and analyze movement of objects in a prescribed physical area, the method comprising:
   receiving video data of the prescribed physical area that originated from at least one camera;
   detecting movement of at least one object in the prescribed physical area generating video metadata in response to the detection of the at least one object in the prescribed area, the video metadata representing the at least one object and its movement in the prescribed physical area;
storing the video metadata in a database;
identifying a number objects in the prescribed physical area by querying the video metadata;
generating and displaying a static visually perceptible report with respect o the identified objects; and
determining video data that is related to the identified objects;
displaying the determined video data simultaneously with the display of the static visually perceptible report, wherein the static visually perceptible report is selectively superimposed upon or displayed adjacent to the determined video data.

5. A system for detecting and analyzing movement of objects in a prescribed physical area, the system comprising:
an interface that receives video data of the prescribed physical area that originated from at least one camera;
a video management system coupled to the interface, the video management system storing the video data;
a video analytics engine coupled to the video management system, the video analytics engine generating video metadata representing at least one object and its movement in the prescribed physical area;
an object movement analytics engine coupled to the video analytics engine and coupled to the video management system, the object movement analytics engine identifying a number of objects in the prescribed physical area, generating a static visually perceptible report with respect to the identified objects, and determining video data that is related to the identified objects; and
a display coupled to the object movement analytics engine, the display simultaneously displaying the static visually perceptible report and the determined video data, wherein the static visually perceptible report is selectively superimposed upon or displayed adjacent to the determined video data.

* * * * *